June 11, 1946. J. S. LEIGH ET AL 2,401,943
SIGNALING APPARATUS
Filed Oct. 30, 1942 2 Sheets-Sheet 1
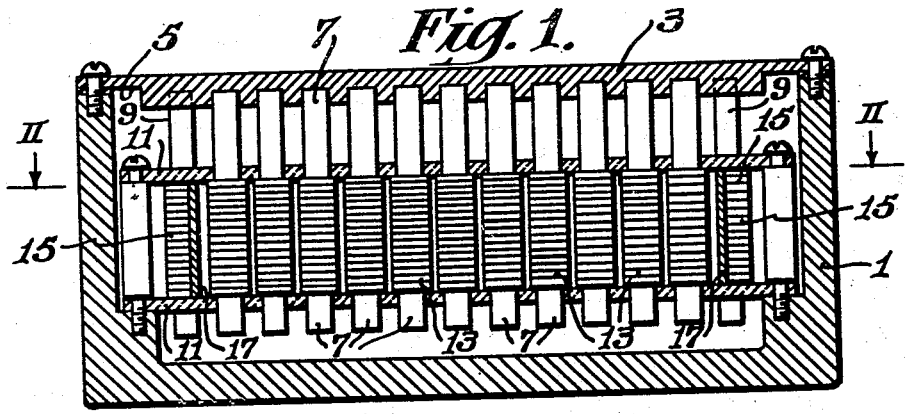
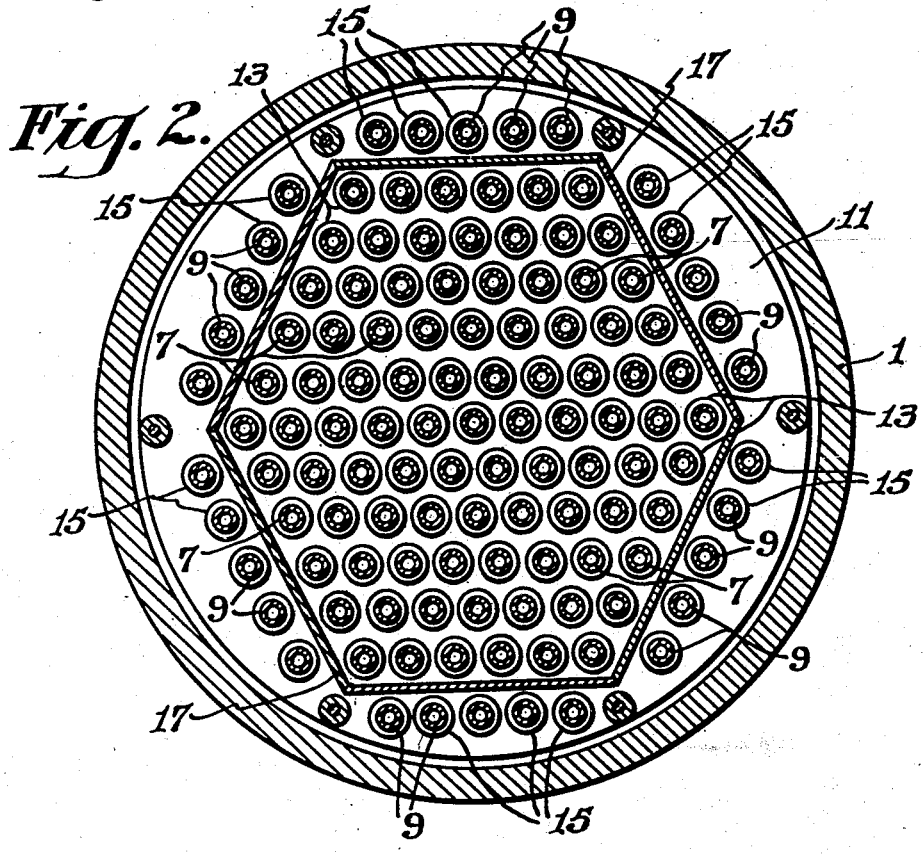
Inventors
John S. Leigh &
Alexander Murdoch, Jr.
Attorney June 11, 1946.                J. S. LEIGH ET AL                2,401,943
                              SIGNALING APPARATUS
                           Filed Oct. 30, 1942              2 Sheets-Sheet 2

Fig. 3.

Inventors
John S. Leigh &
Alexander Murdoch, Jr.
By C.D. Tuska
            Attorney Patented June 11, 1946

2,401,943

UNITED STATES PATENT OFFICE 2,401,943

SIGNALING APPARATUS

John S. Leigh, Haddonfield, N. J., and Alexander Murdoch, Jr., Philadelphia, Pa., assignors to Radio Corporation of America, a corporation of Delaware Application October 30, 1942, Serial No. 463,860

5 Claims. (Cl. 177—386)

This invention relates to signaling apparatus, and more particularly to electro-acoustic transducers of the magnetostrictive type used especially in submarine signaling.

In submarine signaling apparatus employing magnetostrictive projectors or transducers, it is customary to employ master oscillator-power amplifier driver units. One of the difficulties encountered with such driving units is that the frequency drifts, thereby impairing the efficiency of conversion of the supersonic electrical energy into pressure waves in the water.

The primary object of our present invention is to provide improved signaling apparatus of the type indicated which will not be subject to the aforementioned disadvantage.

More particularly, it is an object of our present invention to provide an improved underwater sound system in which the frequency of the system will not drift.

Another object of our present invention is to provide, in submarine signaling apparatus, an improved system for driving the magnetostrictive projector unit such that the frequency of the system will be controlled essentially by the magnetostrictive activity frequency of the projector unit during operation.

A further object of our present invention is to provide an improved submarine signaling apparatus as above set forth which is relatively simple in construction, inexpensive in cost, and highly efficient in use.

In accordance with this invention, we provide a multi-stage amplifier for driving the magnetostrictive projector. A feedback path is provided by means of which energy derived from the moving or vibrating diaphragm, in response to energy delivered thereto by the amplifier, is fed back to the amplifier. Thus, there is formed an oscillator having as its characteristic feature the control of the frequency by the magnetostrictive activity frequency of the projector unit or transducer.

The novel features that we consider characteristic of our invention are set forth with particularity in the appended claims. The invention itself, however, both as to its organization and method of operation, as well as additional objects and advantages thereof, will best be understood from the following description of one embodiment thereof, when read in connection with the accompanying drawings, in which Figure 1 is a longitudinal central sectional view of a transducer or projector unit formed according to our invention, Figure 2 is a sectional view taken on the line II—II of Figure 1 and looking in the direction of the appended arrows, and Figure 3 is a wiring diagram of the electrical circuit used in connection with our invention.

Referring more particularly to the drawings, wherein similar reference characters indicate corresponding parts throughout, there is shown, in Figs. 1 and 2, an open-ended casing 1 over the open end of which is secured a magnetic diaphragm 3. The diaphragm 3 is preferably provided with a thin circumferential portion 5 at which it is secured to the casing 1 whereby the thicker, central portion thereof may be moved substantially as a whole. Secured to the diaphragm 3 in any suitable manner are two sets of magnetostrictive elements 7 and 9 which may be slotted, nickel tubes, for example. The tubes or elements 7, which greatly exceed in number the number of tubes 9, are secured to the diaphragm 3 over a relatively inner or central portion thereof, and the tubular elements 9 are secured to the diaphragm over a relatively outer area of the diaphragm, so that the tubes 9 are located on a greater radius than are any of the tubes 7 and the tubes 9 surround or are disposed about the tubes 7.

Within the casing 1 are two spaced plates 11 having aligned openings through which the tubes 7 and 9 extend. Each of the inner magnetostrictive tubes 7 is surrounded by a separate coil or winding 13, and each of the outer magnetostrictive tubes 9 is surrounded by a separate coil 15. The coils 13 and 15 are all disposed between the two spaced plates 11, as clearly shown in Fig. 1, and are preferably serially connected. However, successive coils 15 are wound in opposite directions so that only alternate coils 15 are wound in the same direction. This has the effect of avoiding magnetic coupling between the coils 15 and the coils 13. A shield 17 of copper or other suitable material is placed around the magnetostrictive tubes 7 and their windings 13, as clearly shown in Fig. 2, to shield the windings 15 electrostatically from the windings 13.

In operation, suitable signal currents are supplied to the windings 13 and the magnetic fields set up thereby cause the tubes 7 to become active magnetostrictively whereby to effect movement of the diaphragm 3. On the other hand, movement of the diaphragm will cause the magnetostrictive tubes to move with it, and therefore will induce signal currents in the coils or windings in well known manner.

An amplifier suitable for driving a projector or transducer unit as above described is shown in Fig. 3. This comprises a single-ended, two stage amplifier of the vacuum tube type having a beam type tube 19 (for example, an RCA 807) in the first stage and a pair of triodes 21 (for example, RCA 811's) in the second stage. The cathode 23 of the tube 19 is connected to ground through a resistor $R_1$ which is shunted by a bypass capacitor $C_1$. The grid 25 of the tube 19 is connected to ground through the usual shunt connected grid leak resistor $R_2$ and grid condenser $C_2$ in series with a choke coil $L_1$. Plate current is supplied to the plate 27 of the tube 19 from a suitable source 31 through a dropping resistor $R_3$ and a choke coil $L_2$, the screen grid 29 of the tube 19 being also connected to the potential source 31 through the dropping resistor $R_3$ and an additional dropping resistor $R_4$. A capacitor $C_3$ in the plate circuit of the tube 19 serves as a D.-C. stopping capacitor, and a pair of capacitors $C_4$ and $C_5$ connected between the resistor $R_4$ and ground serve as R.-F. bypass capacitors.

The output of the amplifier tube 19 is coupled to the tubes 21, which constitute power amplifiers, by a fixed capacitor $C_6$ and a variometer $L_3$, the capacitor $C_6$ and variometer $L_3$ constituting a resonant load for the plate circuit of the tube 19. By adjustment of the variometer $L_3$, the tunable load in the output of the tube 19 may be tuned either to resonance or off-resonance, and in this way, the voltage supplied to the grids of the tubes 21 is controlled, so as to obtain the desired output from the second stage of the amplifier.

The grid circuit of the tubes 21 includes an R.-F. choke coil $L_4$ in series with an ammeter 33 and a dropping resistor $R_5$ which is preferably variable. The resistor $R_5$ may be connected through a keying switch 35 either directly to ground, or to ground through a battery 37 which is arranged to provide a negative bias on the grids of the tubes 21. When the switch 35 is in the lower position for connecting resistor $R_5$ directly to ground, signal potential will be applied to the grids of the tubes 21 from the output of the tube 19 to operate the tubes 21. However, when the switch 35 is thrown to the upper position to connect the resistor $R_5$ to the battery 37, the latter will apply to the grids of the tubes 21 a negative potential below cut-off, so that the signal voltage will not operate the amplifiers 21. A capacitor $C_7$ between the variometer $L_3$ and the grids of the tubes 21 serves as a D.-C. stopping capacitor, and a capacitor $C_8$ connected between the choke $L_4$ and ground serves as an R.-F. bypass capacitor, as do also a pair of capacitors $C_9$ and $C_{10}$ connected between the filaments of the two tubes 21 and ground. Plate potential is supplied to the plates of the tubes 21 from the potential source 31 through an R.-F. choke coil $L_5$. A grounded capacitor $C_{11}$ may be provided in shunt with the potential source 31 and also serves as an R.-F. bypass capacitor.

The plate circuit of the tubes 21 includes a D.-C. stopping capacitor $C_{12}$ and has a load consisting of one or more variable capacitors $C_{13}$ arranged in parallel with the coils or windings 13 which surround the magnetostrictive elements 7. In response to signal energy supplied to the coils 13 by the amplifier, the tubes 7 become magnetostrictively active to actuate the diaphragm. In turn, the diaphragm moves the tubes 9 to induce currents in the windings or coils 15. The coils 15 are arranged in the grid circuit of the tube 19 and therefore will supply voltage to the grid 25 thereof. A variable capacitor $C_{14}$ is preferably provided across the windings 15 to provide a tunable system for improving the wave shape of the excitation voltage and for making certain that maximum voltage will be supplied to the grid 25. A capacitor $C_{15}$ may also be provided in the grid circuit of the tube 19 to serve as a D.-C. stopping capacitor. The windings 13 and 15 are preferably polarized from a suitable D.-C. polarizing source (not shown) through a pair of isolation choke coils 39, and a pair of capacitors $C_{16}$ and $C_{17}$ are provided to serve as R.-F. bypass capacitors.

It will be clear, from the preceding description, that the coils 13, the coils 15, their associated magnetostrictive tubes or elements 7 and 9, respectively, and the diaphragm 3 constitute a feedback path for the amplifier to render the system an oscillation generator. Energy supplied to the windings 13 from the output of the single-ended power stage 21 activates the magnetostrictive elements 7 to produce vibratory movement of the diaphragm 3. On the other hand, vibratory movement of the diaphragm 3 causes the attached magnetostrictive elements 9 to move and thereby currents are set up in the windings 15 to produce voltages which are applied to the grid 25 of the tube 19. The magnetostrictive activity frequency of the transducer or projector unit, that is, the natural resonant frequency of the mechanical, vibratory system when it is vibrating, thus controls the frequency of the oscillator and there is no possibility of frequency drift impairing the efficiency of the system.

Although we have shown and described but one embodiment of our invention, it will be apparent to those skilled in the art that many other forms thereof, as well as changes in the one described, are possible. Thus, any suitable number of magnetostrictive elements 7 and 9 may be employed, ninety-one elements 7 and thirty elements 9 having been shown merely by way of illustration. If desired, the windings 13 and 15 may be arranged in parallel relation instead of being connected serially. Also, various changes may be made within the amplifier itself. Many other modifications will, no doubt, readily suggest themselves to those skilled in the art. We therefore desire that our invention shall not be limited except insofar as is made necessary by the prior art and by the spirit of the appended claims.

We claim as our invention:

1. In signaling apparatus, the combination of an electro-acoustic transducer comprising a vibratory diaphragm, a plurality of magnetostrictive elements secured to said diaphragm, a separate winding associated with each of said elements, said elements being actuable in response to signal currents passed through said windings to move said diaphragm and said diaphragm being actuable in response to external forces applied thereto to induce signal currents in said windings, and an electrical signal amplifier having an input circuit and an output circuit, certain of said windings being connected in said output circuit whereby they are adapted to actuate their associated elements to cause them to effect movement of said diaphragm, and certain other of said windings being connected in said input circuit for feeding back to said amplifier signal energy induced therein in response to movement of said diaphragm, said certain other windings being serially connected and being wound alternately in opposite directions.

2. The invention set forth in claim 1 characterized in that the elements associated with said first named certain windings are secured to a relatively inner portion of said diaphragm, and characterized further in that the elements associated with said second named certain windings are secured to a relatively outer portion of said diaphragm.

3. The invention set forth in claim 1 characterized in that the elements associated with said first named certain windings are secured to an area of said diaphragm which is of smaller radius than the area of said diaphragm to which the elements associated with said second named certain windings are secured.

4. The invention set forth in claim 1 characterized in that the elements associated with said first named certain windings are secured to an area of said diaphragm which is of smaller radius than the area of said diaphragm to which the elements associated with said second named certain windings are secured, and charcterized further in that said last named elements are disposed circumferentially about said first named elements.

5. The invention set forth in claim 1 characterized in that the elements associated with said first named certain windings are secured to an area of said diaphragm which is of smaller radius than the area of said diaphragm to which the elements associated with said second named certain windings are secured, characterized further in that said last named elements are disposed circumferentially about said first named elements, and characterized still further by the addition of electrostatic shielding means around said first named windings whereby to shield said first named windings electrostatically from said second named windings.

JOHN S. LEIGH.
ALEXANDER MURDOCH, Jr.